United States Patent
Saltz et al.

(10) Patent No.: US 7,536,722 B1
(45) Date of Patent: May 19, 2009

(54) AUTHENTICATION SYSTEM FOR TWO-FACTOR AUTHENTICATION IN ENROLLMENT AND PIN UNBLOCK

(75) Inventors: Michael K. Saltz, San Jose, CA (US); Aseem Sharma, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 832 days.

(21) Appl. No.: 11/089,700

(22) Filed: Mar. 25, 2005

(51) Int. Cl.
*H04L 9/32* (2006.01)

(52) U.S. Cl. .................................... 726/20
(58) Field of Classification Search ............... 726/20, 726/4, 9
See application file for complete search history.

(56) References Cited

U.S. PATENT DOCUMENTS

| | | | | |
|---|---|---|---|---|
| 7,219,154 B2* | 5/2007 | Blakley et al. | ............. | 709/229 |
| 7,302,703 B2* | 11/2007 | Burns | ......................... | 726/20 |
| 7,412,420 B2* | 8/2008 | Holdsworth | ................ | 705/44 |
| 2001/0045451 A1* | 11/2001 | Tan et al. | ..................... | 235/375 |
| 2002/0026397 A1* | 2/2002 | Ieta et al. | ...................... | 705/35 |
| 2003/0115267 A1* | 6/2003 | Hinton et al. | ............... | 709/204 |
| 2004/0103325 A1* | 5/2004 | Priebatsch | .................. | 713/202 |
| 2004/0215964 A1* | 10/2004 | Barlow et al. | ............... | 713/172 |

* cited by examiner

*Primary Examiner*—Emmanuel L Moise
*Assistant Examiner*—Ali S Abyaneh
(74) *Attorney, Agent, or Firm*—Martine Pennilla & Gencarella, LLP

(57) ABSTRACT

An authentication system includes a smart access card issued to a user, a client computer, a desktop authentication module configured to prevent a user from accessing resources of the client computer prior to successful completion of a two factor authentication; a card reader interface providing communication between the smart access card and the desktop authentication module; and an enrollment server for enrolling the access card into a server data store. The smart access card has an authentication credential comprising an authentication certificate and a card unique identifier. The enrollment server is in communication with the desktop authentication module via a network connection for receiving the authentication credential from the smart access card and performing two factor authentication for a user, the two factor authentication using the authentication credential prior to the enrolling.

22 Claims, 5 Drawing Sheets

AUTHENTICATION SYSTEM FOR TWO-FACTOR AUTHENTICATION IN ENROLLMENT AND PIN UNBLOCK

CROSS REFERENCE TO RELATED APPLICATIONS

This application is related to commonly-assigned U.S. patent application Ser. Nos. 10/877,842 filed on Jun. 25, 2004 by Aseem Sharma et al., entitled "Server Authentication in Non-Secure Channel Card PIN Reset Methods and Computer Implemented Processes," U.S. patent application Ser. No. 10/877,743 filed on Jun. 25, 2004 by Ellen Siegel et al., entitled "Authentication System And Method for Operating the Same," and U.S. patent application Ser. No. 10/877,350, filed on Jun. 25, 2004 by Oscar Montemayor et al., entitled, "Method For Using JAVA Servlets as a Stack Based State Machine," all of which are hereby incorporated by reference.

BACKGROUND

Description of the Related Art

Controlling access to computing resources and data is of major importance in today's digital security environment. Without sufficient security measures to restrict access to authorized entities, sensitive data and resources can be compromised beyond recovery. Authorized entities are identified through authentication. Authentication is a test or series of tests designed to discriminate between an authorized user and an unauthorized user. Authentication should prevent unauthorized users from gaining access to sensitive information through illegitimate means, for example, by pretending to be an authorized user.

Various tests have been developed to identify a user and ensure that the user is who they say they are. Each test generally falls in one of three categories, or factors which test what the person is, what the person knows, or what the person has. A computer can identify a person by what they are through various biometric tests such as thumb print scans. A computer can identify a person by what they know using a password. And, a computer can identify a person by what they have by using a magnetic card, smart card, key fob, or other means.

An authentication system that uses two factors, e.g., what the person has and what the person knows, is considered to be much stronger than an authentication system that uses only one, such as a username and password combination. Unfortunately, many computer systems in use today are connected to sensitive networks or databases containing sensitive information but are protected only by one factor authentication. One of the challenges in providing strong two factor authentication has been in the areas of enrollment and personal identification number (PIN) unblocking. These operations generally require steps by both the user and an administrator. It would be desirable to allow a user to enroll or unblock the PIN at his or her own terminal or work station. However, this generally requires access to the same computer resources that are intended to be protected by the authentication process.

Thus, a need exists for strong authentication mechanisms to control access to vulnerable computing domains while at the same time permitting enrollment and PIN unblocking. Furthermore, it would be desirable to require at least two factor authentication of individuals prior to permitting them to perform enrollment and PIN unblocking procedures.

SUMMARY OF THE INVENTION

Broadly speaking, the present invention fills these needs by providing a procedure implemented in a desktop authentication module that performs enrollment and PIN unblock operations without granting access to computing resources.

It should be appreciated that the present invention can be implemented in numerous ways, including as a process, an apparatus, a system, a device, or a method. Several inventive embodiments of the present invention are described below.

In one embodiment, an authentication system includes a smart access card issued to a user, a client computer, a desktop authentication module configured to prevent a user from accessing resources of the client computer prior to successful completion of a two factor authentication; a card reader interface providing communication between the smart access card and the desktop authentication module; and an enrollment server for enrolling the access card into a server data store. The smart access card has an authentication credential comprising an authentication certificate and a card unique identifier. The enrollment server is in communication with the desktop authentication module via a network connection for receiving the authentication credential from the smart access card and performing two factor authentication for a user, the two factor authentication using the authentication credential prior to the enrolling.

In another embodiment, a method for enrolling a smart access card in a user authentication system comprises sending a username and password from a client to an authentication server for lightweight directory access protocol (LDAP) authentication wherein an authentication server sends a single sign-on (SSO) token to the client. The username, password, smart card unique identifier (CUID), user identifier (UID) and smart access card public key infrastructure (PKI) certificate is sent in an enrollment request to an enrollment server, the enrollment server being configured to execute two factor authentication in response to the enrollment request. An entry is created in a server data store containing information pertaining to the smart access card when the two factor authentication is successful. A message is then sent to the client when the entry is created. A new PIN is requested from a user at the client in response to receiving the message.

In yet another embodiment, an enrollment server software application comprises a code segment for receiving from a client computer a password and username of a user, a public key infrastructure (PKI) certificate from a smart access card a card unique identifier (CUID) from the smart access card, and a user identifier (UID), a code segment for accessing a data store to verify a first condition that the UID and the CUID correspond, a code segment for verifying a second condition that a digital signature of the PKI certificate is valid, a code segment for verifying a third condition that the PKI certificate corresponds to the CUID, and a code segment for accessing the data store to verify a fourth condition that the state of the smart access card status is valid for enrollment.

Advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

In the following description, numerous specific details are set forth in order to provide a thorough understanding of the present invention. However, it will be apparent to one skilled in the art that the present invention may be practiced without some of these specific details. In other instances, well known process operations have not been described in detail in order to avoid unnecessarily obscuring the invention.

Figure 1:
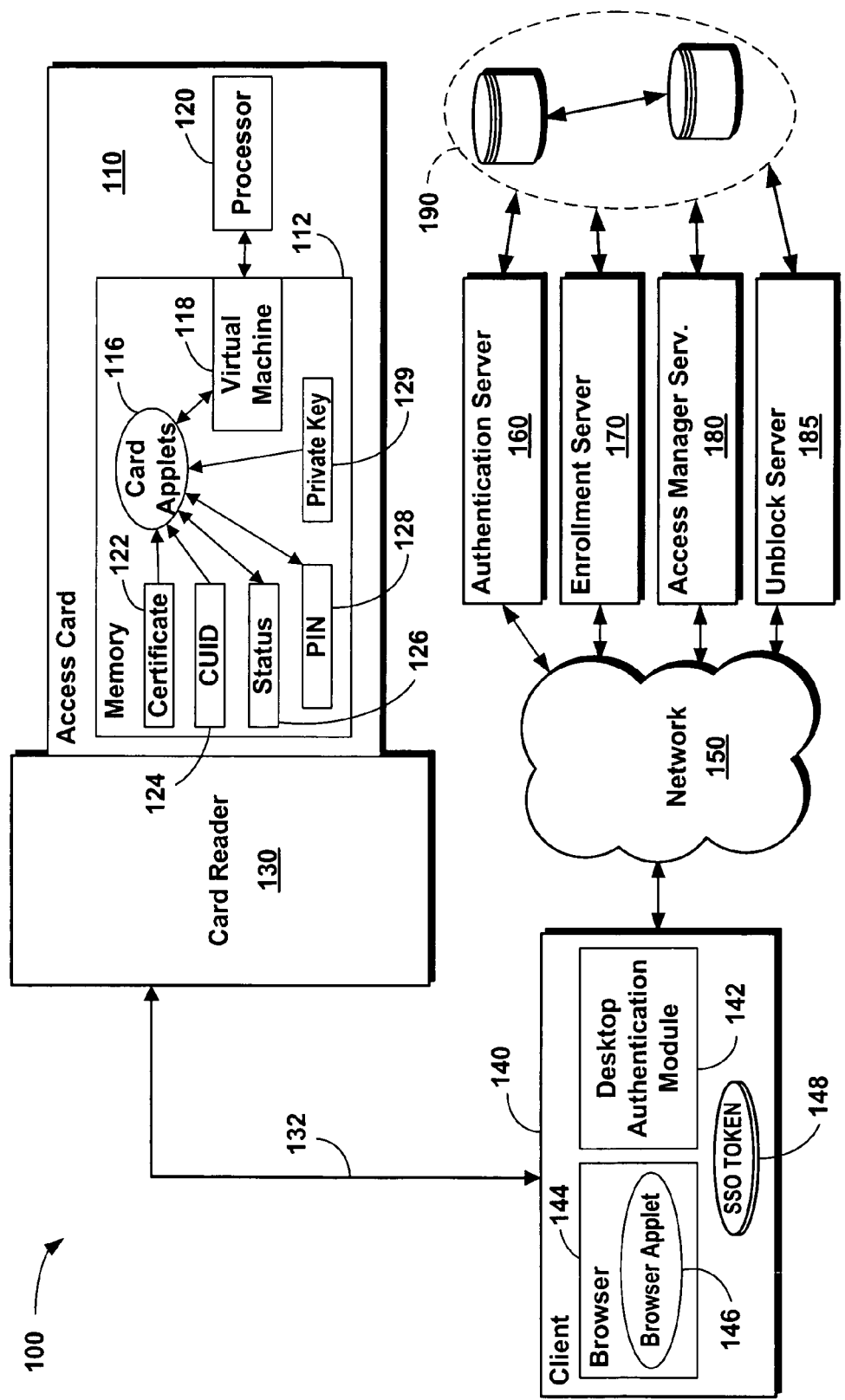
FIG. 1 shows an overview of an exemplary authentication system 100.

FIG. 1 is an illustration showing an authentication system 100 in accordance with one embodiment. The authentication system includes a smart access card 110, a card reader 130, a client 140, and a network 150. In addition, a number of servers provide various functions in enrollment and authentication. Authentication server 160 provides a mechanism to identify a user. Enrollment server 170 provides a mechanism to enroll a user and update a card status. Access Manager 180 aids in determining what users have access to the computer resources. Unblock server 185 is charged with enabling a PIN unblock procedure.

Card 110 serves as a secure container for authentication credentials. In one embodiment, card 110 includes a processor 120 and memory 112. The authentication credentials reside in memory 112 and include an authentication keypair, i.e., a public key and a private key 129, and an authentication certificate ("certificate") 122. In one embodiment, the private key exists and resides in memory 112 and the public key is provided within certificate 122 stored in memory 112. Memory 112 also contains executable programs that run on processor 120. In one embodiment, these executable programs comprise applets 116.

Card applets 116 execute in conjunction with virtual machine 118 which is executed by processor 120. Virtual machine 118 may be designed to execute applets 116 such that the applets need not be written specifically for processor 120. An example of a virtual machine is a Java® virtual machine. The use of a virtual machine allows applets to be developed independently of the particular processor and other hardware attributes of card 110.

In one embodiment, the card 110 is provisioned with necessary authentication components at the time of manufacture or prior to delivery to an entity that will deploy authentication system 100. At the time of provisioning card 110, it is assigned a card unique identifier (CUID) 124 and is loaded with an authentication certificate 122. In one embodiment, the certificate is an x.509 certificate, wherein the CUID is also loaded in an identifier field of the x.509 certificate. In one embodiment, card 110 is a Java Card™ compliant with Java Card Enterprise Software™. In this embodiment, card 110 may be configured to include functionality beyond what is necessary for the authentication process. Card applets 116 may also be placed on the card 110 when the card is provisioned. Card applets 116 are executed on card 110 and generally do not leave card 110.

Card reader 130 and card 110 are in communication with each other through a active radio frequency identification system (RFID) such as one conforming to one or more standards promulgated by the International Organization for Standardization (ISO). An authentication processes may be effectively implemented regardless of the specific connections between authentication server 160, client 140, card reader 130, and the card 110.

In one embodiment, the client 140 includes a desktop authentication module 142 configured to interface with card reader 130 through a connection 132. Connection 132 can of course be implemented using either an electrical connection, a wireless connection, or a combination thereof. Desktop authentication module 142 represents customized software that enables authentication within a particular desktop authentication framework. The desktop authentication framework limits a user's access to computer resources of a desktop system until an authentication process is successfully completed. In one embodiment, the user is limited to accessing the desktop authentication module and is not allowed access to the computer's resources until the authentication process is successfully completed. Examples of desktop authentication frameworks for which the desktop authentication module 142 can be configured include a Pluggable Authentication Module (PAM) framework and a Windows Graphical Identification and Authentication (GINA)/Cryptographic Service Provider (CSP) framework.

In another embodiment, the client 140 includes a browser 144 configured to interface with the card reader 130 through connection 132. Browser 144 is capable of executing one or more browser applets 146 downloaded from the authentication server 160 or other server. In one embodiment, browser applets 146 are downloaded from authentication server 160 to the client 140 when a user navigates browser 144 to a web page containing the browser applets 146. Client 140 may be configured to provide both or either of browser 144 and desktop authentication module 142 for performing various processes related to authentication. With both browser 144 and desktop authentication module 142, communication can be performed using the Hypertext Transfer Protocol (HTTP).

Authentication server 160, Enrollment server 170, Access Manager Server 180, and Unblock server 185 communicate over network 150 with client 140. Network 150 may be any network connection. For example, Network 150 may include a LAN or wireless LAN connection, an internet connection, a point-to-point connection, or other network connection and combinations thereof.

Nominally, each server is one or more computer software programs that together perform the function of serving. However, servers 160, 170, 180, and 185 may each be a dedicated server, i.e., a computer system solely functioning in the capacity of a server, or exist as a program on a general purpose computer that performs other tasks. All servers 160, 170, 180, and 185 may reside on a common computer and share a computer processor, and other hardware. Alternatively, one or more of the servers may reside on separate computers. Furthermore, one or more of servers 160, 170, 180, and 185 may be servlets that run on one or more Java® platforms in conjunction with one or more web servers.

Data store 190 comprises one or more computer storage devices containing data necessary for authentication and related activities. The storage devices may be a single storage device containing a single copy of the necessary data, or may be a plurality of storage devices located remotely from one another and/or from the associated servers 160, 170, 180, and 185. If the plurality of storage devices contain multiple copies of data, the data may be shared and updated to keep the copies of the data consistent with each other. It should also be appreciated, however, that certain data may reside solely with one or more of the servers in addition to or apart from data store 190.

In one embodiment, communication through network 150 can be performed using a secure protocol such as the Secure Sockets Layer (SSL) protocol, the Transport Layer Security (TLS) protocol, or other similar secure protocol. As will be understood by those skilled in the art, SSL and TLS operate in conjunction with HTTP. It should be appreciated that, while communication across network 150 may be implemented using HTTP/SSL, any secure protocol may be used.

In one embodiment, servers 160, 170, 180, and 185 reside on one or more computers which each represent an independent computing platform. Client 140 also represents an independent computing platform. In various embodiments, these independent computing platforms contain other components not explicitly shown in the exemplary authentication system 100 such as a processor and peripheral devices including storage components, display components, user interface components, etc.

Authentication system 100 enables two-factor authentication by verifying the presence of both specific knowledge of the user (the first factor) and a specific access card 110 issued to the user (the second factor). Authentication system 100 authenticates the access card using the certificate stored on access card 110 and matches the user's password and user identifier (UID) with the card unique identifier (CUID).

Figure 2:
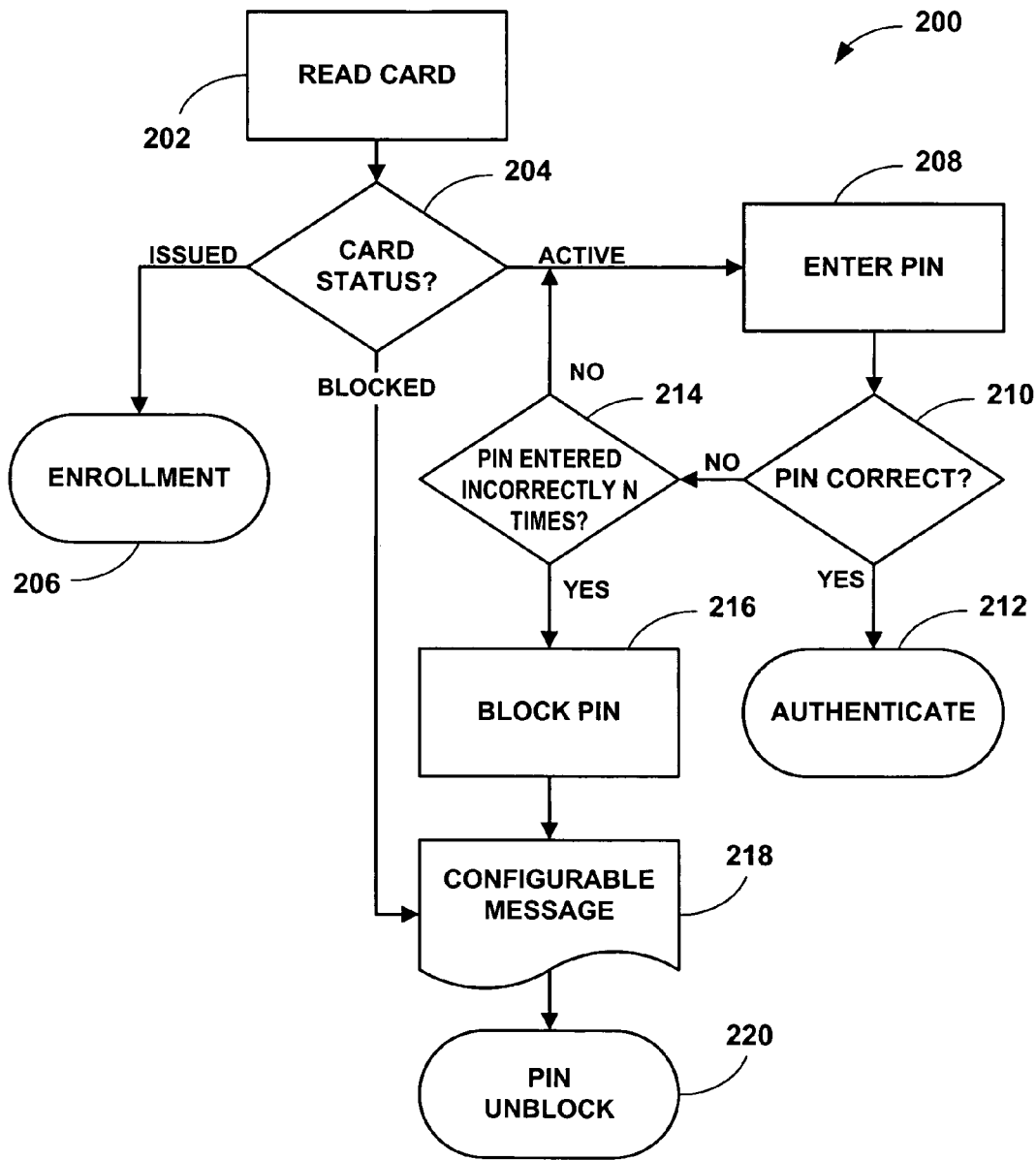
FIG. 2 shows a flowchart representing a simplified exemplary procedure for logging into a secured computer system.

FIG. 2 shows a flowchart 200 representing a simplified procedure for logging into a secured computer system. The procedure is outlined from the vantage point of the user for the purpose of illustrating the relation between various authentication related procedures and operations. Thus, the exemplary procedure illustrated in FIG. 2 is not carried out by any one component of the authentication system shown in FIG. 1. For this procedure, it is assumed that a user has an access card and is approaching a locked computer with a desktop authentication module displaying a log-in prompt. In operation 202, the user inserts card 110 into reader 130. Desktop authentication module proceeds to query card 110 via the interface provided by reader 130 and determines the status of card 110.

Referring back for the moment to FIG. 1, each access card 110 maintains a conception of its own status by a status variable 126 stored in memory 112. When a card is first provisioned, it is given the status of PRINTED, which means the card has not yet been assigned to a specific user. When card 110 is being assigned to a specific user, the status is changed to ISSUED. Once the user enrolls and selects a personal identification number (PIN) presented to a user for access to a computer system, the status is changed to ACTIVE. Other possible status states include BLANK and REVOKED. When a card is issued to a user, a user record is created in data store 190. The user record also contains a field that identifies the status of card 110. For example, the user record, after being created but prior to a card being given to a user might include a status of BLANK or PRINTED. Once a card is assigned to a user, the status changes to ISSUED. After a card entry is created in data store 190, the status is changed to ENROLLED. Finally, after the enrollment process is complete and the user assigns a PIN, then status is changed to ACTIVE.

In a card read operation, the status of the card is queried by client 140. The status stored by card 110 is returned to client 140 and the procedure shown by flowchart 200 in FIG. 2 flows to operation 204. Depending on the card status the procedure follows various tracks. If the card is ISSUED, then the procedure flows to operation 206 which directs the user through an enrollment process. An exemplary enrollment process is described below with reference to FIGS. 3A and 3B below.

If, at operation 204, the card status is ACTIVE, then the procedure flows to operation 208 wherein the user is requested to input the user's PIN. Next, in operation 210, the PIN is verified against a copy of the pin stored in card 110 (FIG. 1). If the PIN is correct, the procedure flows to operation 212 wherein an authentication procedure is carried out. An exemplary authentication procedure is described in related U.S. patent application Ser. No. 10/877,743 filed on Jun. 25, 2004 by Ellen Siegel et al., entitled "Authentication System And Method for Operating the Same," which is incorporated herein by reference in its entirety.

If, at operation 210, the PIN is not correct, the procedure flows to operation 214. If the PIN has been incorrectly entered fewer than a selected number of times, then the procedure flows back to operation 208, giving the user another opportunity to enter the correct PIN. However, if the PIN has been incorrectly entered a threshold number N times, then the procedure flows to operation 216 wherein the PIN is blocked. The blocking of the PIN occurs within card 110 as the card keeps track of how many consecutive times an incorrect PIN has been entered. After reaching the threshold number of times, card 110 blocks further attempts at accessing the authentication credentials stored within card 110. The card status information stored by card 110 is changed to BLOCKED and card 110 returns a message to client 140 indicating that card 110 is blocked.

At operation 218, desktop authentication module 142 responds to this message with a configurable message presented to the user. The configurable message is configurable by the network administrator or other individual responsible for maintaining authentication system 100. The configurable message may be stored on the authentication server 160 or stored locally by client 140. Specifically, the configurable message will instruct the user as to what steps are necessary to unblock the PIN. These steps will generally require the user to talk with an individual administrator who will then, upon being satisfied that the user is actually the person who should be in possession of the particular card, takes an action at the back end (as will be further described below with reference to FIG. 4) which enables the user to unblock the card. The procedure then flows to operation 220 in which a PIN unblock procedure is launched. An exemplary PIN unblock procedure is described below with reference to FIG. 4.

Figure 3A:
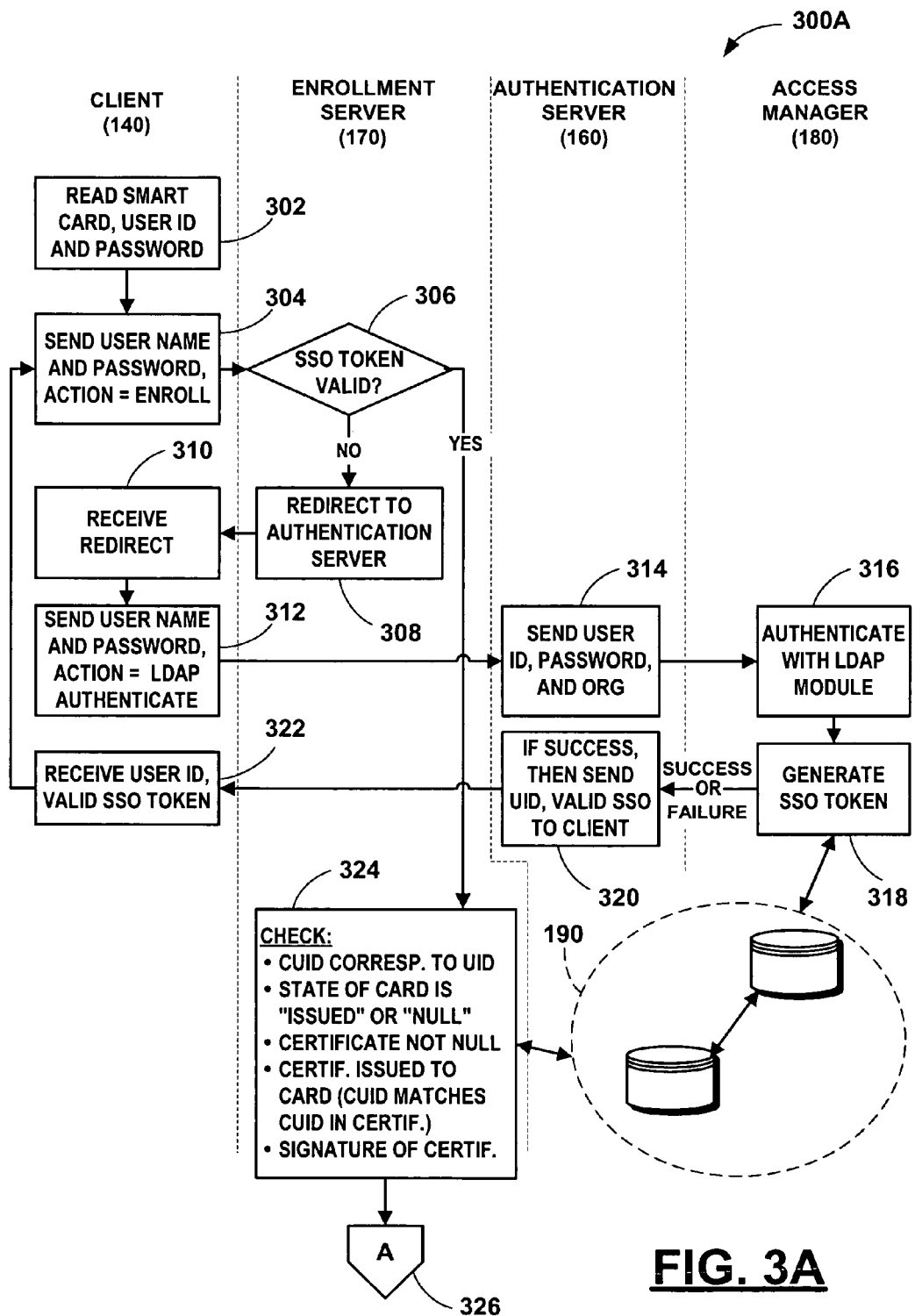
FIGS. 3A and 3B together show a flowchart depicting an exemplary enrollment procedure.

Referring now to FIGS. 1 and 3A, an exemplary enrollment procedure is outlined by flowchart 300A. Initially, in operation 302, the smart card is read to retrieve the certificate and CUID. Next, in operation 304, this information, along with single sign-on (SSO) token 148 (FIG. 1) stored locally by client 140, is sent to enrollment server 170. SSO tokens allow a user to be authenticated once and access multiple servers that recognize and can confirm the validity of the SSO token, thereby allowing the user to avoid multiple authentication procedures across multiple servers. Each SSO token may be time-stamped such that the SSO token is only valid for a selected amount of time or number of days. More information is available on SSO tokens from U.S. Pat. No. 6,668,322 issued to Wood et al. on Dec. 23, 2003 and from Chapter 1 of *Directory Server Access Management Edition Programmer's Guide*, published in 2002 by Sun Microsystems, Inc. and available at http://docs.sun.com/source/816-5628-10/intro.html, both of which are incorporated herein by reference. The SSO token may be stored in a browser cookie when using client browser 144 or in any other convenient manner as would occur to those skilled in the art, e.g., when using the desktop authentication module. If the card state is ISSUED and the user has not previously attempted access, then the SSO token will be missing or invalid.

The procedure flows to operation 306, wherein a determination is made whether the SSO token is valid. If the SSO token is not valid, then the procedure flows to operation 308 wherein enrollment server 170 sends a message to client 140 redirecting the client to authenticate using authentication server 160. At next operation 310, client 140 receives the redirect message, and in response to this message, at operation 312, client 140 sends the user's username and password to authentication server 160 along with an action request for lightweight directory access protocol (LDAP) authentication. LDAP services are a well understood technology established by the Internet Engineering Task Force. Essentially, the LDAP provides a protocol and directory for users, groups and entities within an organization. LDAP authentication provides a check that the user information corresponds with an entry in the LDAP directory. The LDAP utilizes a distinguished name (DN) to identify users and entities within the directory. The DN provides a number of fields of data identifying a specific user or entity. The fields are variable and generally include a common name (e.g., the user's given and family name) organization (e.g., the company employing the user), address, and user identifier (UID).

The procedure flows to operation 316 wherein authentication server 160 passes the UID, password and organization code to access manager 180. At operation 316, access manager 180 receives the UID, password and organization name. The procedure then flows to operation 318 wherein an LDAP authentication module is invoked with the user information which returns with a valid SSO token. The LDAP authentication module accesses directory information stored in data store 190 to verify the user information. A success or failure message is sent back to authentication server 160 along with the valid SSO token. Next, in operation 320, if the LDAP authentication was successful, the valid SSO token is sent to client 140.

At operation 322, client 140 receives the valid SSO token and is informed that LDAP authentication has successfully completed. If the LDAP authentication is not successful, then an error message is displayed. The procedure then flows back to operation 304 wherein client 140 reattempts initiating enrollment with enrollment server 170. In operation 304, the valid SSO token, distinguished name, UID, and certificate 122 are sent to enrollment server 170. The procedure flows again to operation 306 wherein enrollment server 170 checks for a valid SSO token, but this time finds a valid SSO token. Upon finding a valid SSO token at operation 306, the procedure flows to operation 324 wherein enrollment server 170, by accessing data store 190, makes the following checks: (1) that the CUID corresponds to the UID, i.e., that the card identified by the CUID has been issued to the user identified by the UID; (2) that the state of card 140, as understood in the directory in data store 190 is ISSUED or NULL; (3) that the authentication certificate 122 is not null, i.e., that it is present. If the certificate is present, then it is further checked to ensure (4) that authentication certificate 122 is issued to the card, i.e., by checking that the authentication certificate contains a copy of the CUID that matches the CUID given; (4) that the signature of authentication certificate 122 is valid. These checks are exemplary, not all checks may be required in all circumstances and other checks may be possible as would occur to those of skill in the art.

The checks in operation 324 provide two factor authentication prior to proceeding with the actual enrollment. To provide increased security, user record in data store 190 may include a timestamp which would limit the amount of time user would have to enroll to a specific window. The two factor authentication is satisfied by the user having provided a password which is specific knowledge that only the user should have and by checking for presence of the second factor in operation 324, i.e., card 110, which only the user should carry. The presence of card 110 is verified by checking the signature and contents of the certificate contained on the card. If the two factor authentication fails, then a failure notice is sent to the user via client 140. However, if the two factor authentication is successful, then the enrollment procedure proceeds as indicated by jump block 326 in FIG. 3A and continuation block 328 in FIG. 3B.

Figure 3B:
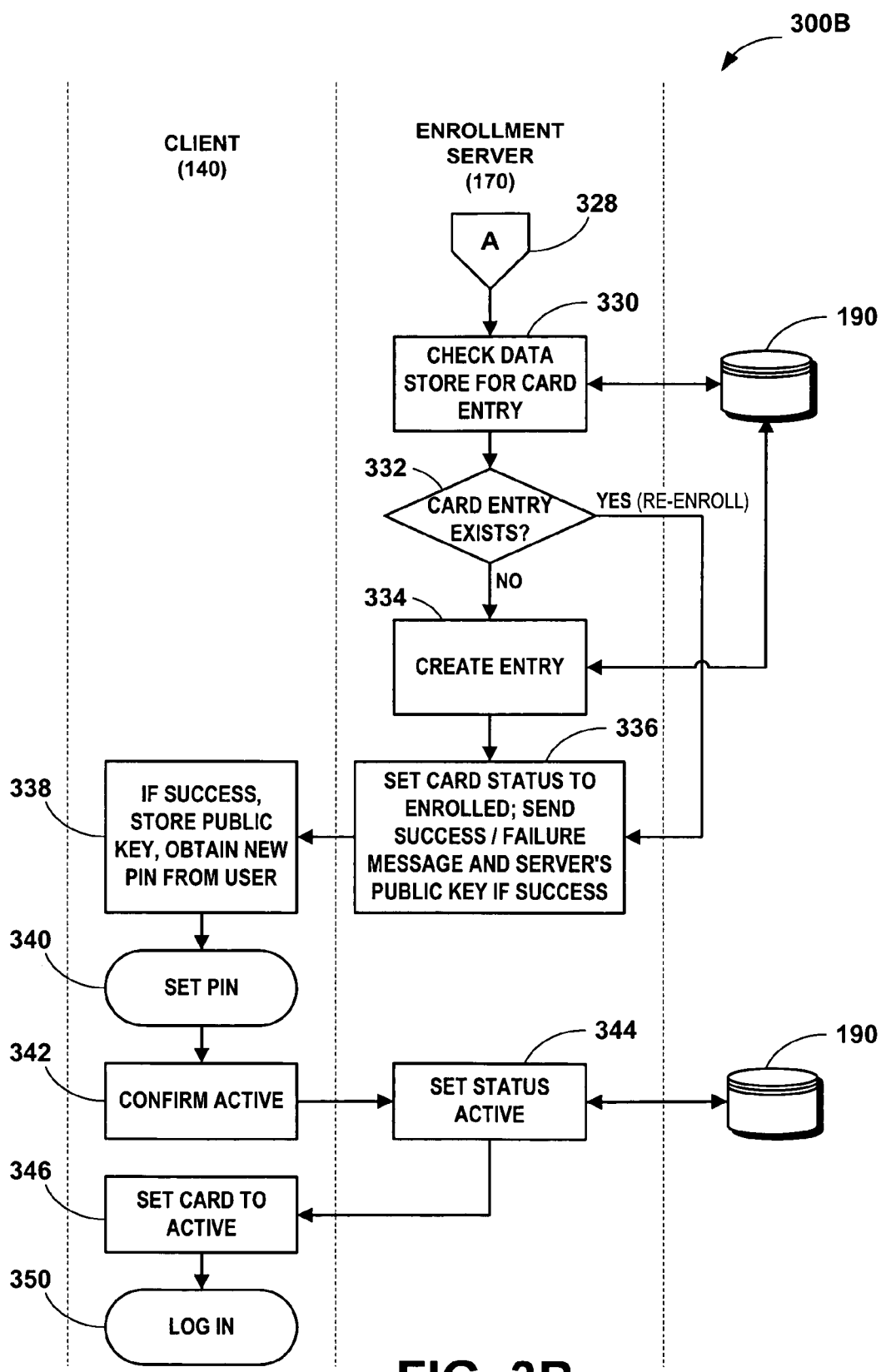

FIG. 3B shows a flowchart 300B that continues flowchart 300A in FIG. 3A. Flowchart 300B continues from Flowchart 300A as indicated by continuation block 328 and proceeds to operation 330 wherein data store 190 is accessed to see whether an entry exists for card 110. Next, in operation 332, a determination is made whether the entry exists. If no entry exists then the procedure flows to operation 334 wherein an entry is created in data store 190. The entry will include the distinguished name of the card, certificate of the card, and indicate the status of card 110 which is now ENROLLED. Prior to creating this entry, the database only contains the CUID of the card which is cross referenced with the user to whom the card is assigned. Optionally, a timestamp defining a window during which enrollment may proceed is also present as described above. If an entry existed with status of BLANK or PRINTED, it is changed to ENROLLED at this point. After the entry is created, the procedure flows to operation 336. If, at operation 332 an entry already existed for card 110, the procedure would also continue with operation 336 for re-enrollment. At operation 336, a success or failure message is sent to client 140. If the operation is successful, then the server public key is sent to client 140 for storing into card 110.

In operation 338, client 140 receives a success message and prompts the user to input a new PIN number. The procedure flows to operation 340 wherein the PIN is stored in card 110. An exemplary procedure for setting PIN 128 is described in U.S. patent application Ser. No. 10/877,842 filed on Jun. 25, 2004 by Aseem Sharma et al., which is incorporated herein by reference. The PIN is stored securely in card 110 and is known only by the user.

After resetting the PIN, the procedure flows to operation 342 wherein a confirm status ACTIVE message is sent to enrollment server 170. This message informs enrollment server that the PIN was successfully set by the user (the PIN is not transmitted to enrollment server 170). Enrollment server 170, in response to the confirm ACTIVE message in operation 344 updates the card record in data store 190 to indicate that the card is ACTIVE, and sends a success/failure message back to client 140. Client 140, then, in operation 346 messages card to indicate successful completion of enrollment and card 110 sets its status to ACTIVE. Client 140 then proceeds with a log-in prompt for user to log in operation 350. An exemplary authentication process is described by U.S. patent application Ser. No. 10/877,743 filed on Jun. 25, 2004 by Ellen Siegel et al., entitled "Authentication System And Method for Operating the Same" which is incorporated by reference herein.

Figure 4:
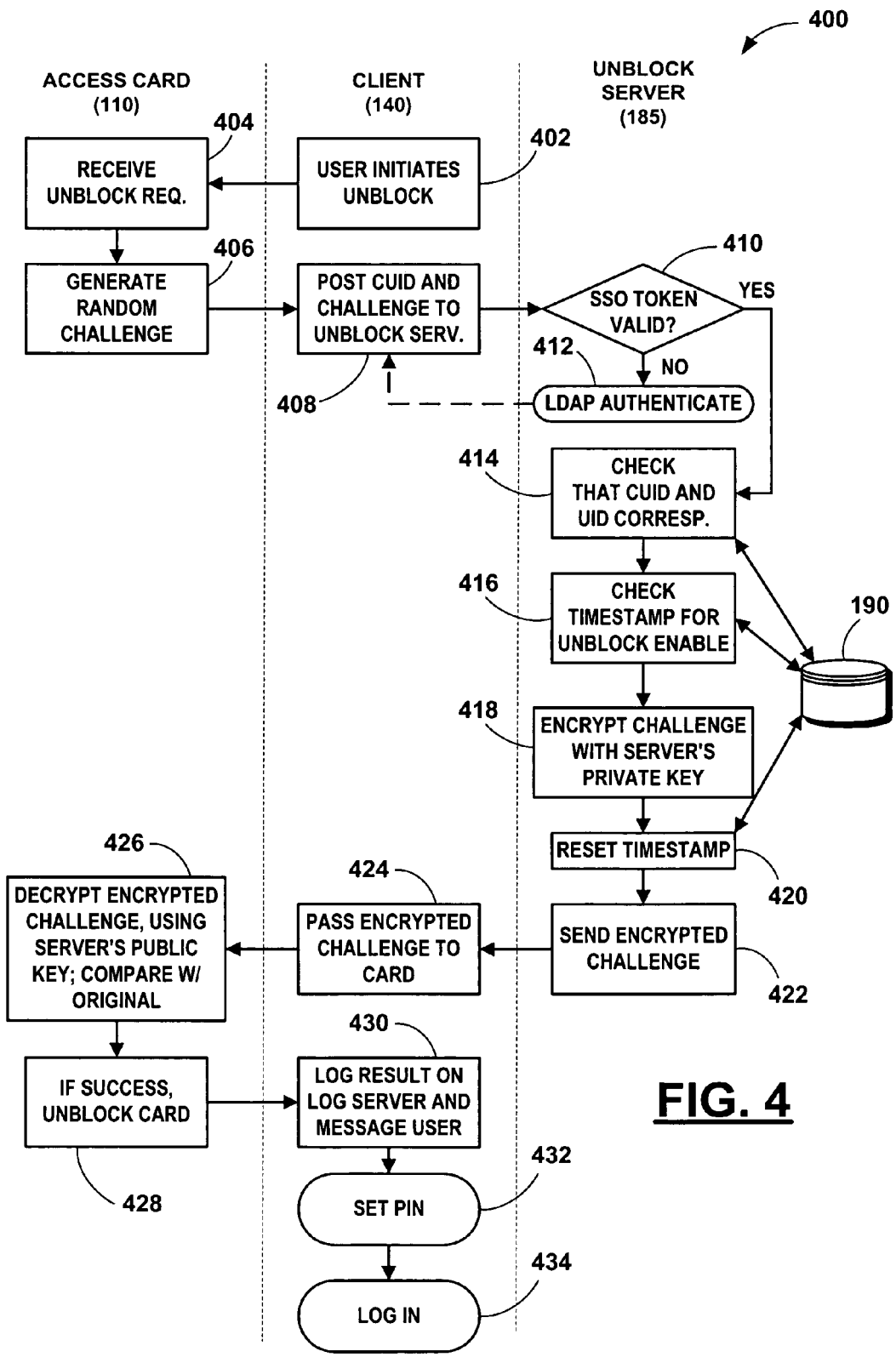
FIG. 4 shows a flowchart 400 depicting an exemplary PIN unblock procedure.

FIG. 4 shows a flowchart 400 depicting an exemplary PIN unblock procedure. The procedure begins with operation 402 wherein the user initiates a PIN unblock procedure. As mentioned above with respect to FIG. 2, card 110 will block the PIN when an incorrect PIN has been entered a selected number of times. The user is notified by a configurable message that the PIN is blocked. The configurable message will instruct the user as to how to proceed with unblocking. Unblocking, as will be further described, requires an administrator to enable unblocking at the server side. Thus the user will be required to contact the administrator to unblock the PIN. After the administrator is contacted the user clicks a button in the user interface or otherwise initiates the unblock procedure through the user interface.

Upon initiation, client 140 sends an unblock request to card 110. Next, in operation 404, card 110 receives the unblock request and formulates a random challenge in operation 406. The random challenge is a string of randomly generated values. The purpose of the random challenge is to authenticate the server to the card to ensure that the administrator issued the unblock enable, in a manner that will be made clear. The random challenge is sent back to client 140.

Next, in operation 408, client 140 receives the random challenge from card 110, and posts the same, along with the CUID to unblock server 185. In response to the unblock request, unblock server 185 checks for a valid SSO token in operation 410. If the SSO token is not valid, then an LDAP authentication processes is initiated in operation 412. The LDAP authentication process is the same as mentioned previously with reference to FIG. 3A. After LDAP authentication, client 140 has a valid SSO and repeats operation 408. If, at operation 410, the SSO token is valid, then the procedure flows to operation 414.

At operation 414, unblock server 185 checks that the UID corresponds to the CUID. If it does not, then a failure message is sent back to client 140 (not shown). Other authentication tests such as those mentioned above with respect to FIG. 3A may also be implemented as necessary and depending upon application. If the CUID and UID are associated then the procedure flows to operation 416 wherein the unblock enable time stamp is checked. This prevents a user from unblocking his or her card without approval from an administrator. The approval process helps ensure that the user has legitimate use of the card and prevents a rogue user from using someone else's card. The timestamp provides a limited window of opportunity for the user to unblock his or her card after which the unblock enable expires and the user must again contact the administrator. The time period may be selected by the administrator. After verifying the unblock enable timestamp, the procedure flows to operation 418 wherein the random challenge generated by card 110 is encrypted with the server's private key.

The server's private key may be encrypted in a key store which may be stored in data store 109. Access to the key store requires a password to open. The password is generated at runtime and is inaccessible to both users and administrators. The server's private key is the counterpart to the server's public key which is transmitted to card 110 during the enrollment process as discussed above with respect to FIG. 3B.

After the challenge is encrypted, unblock server 185 resets the unblock enable time stamp at operation 420 to prevent a repeat unblock without the network administrator's knowledge and approval. The encrypted challenge is then transmitted to client 140 in operation 422. Then, in operation 424, client 140 passes the encrypted challenge to card 110. In operation 426, having received the encrypted challenge, card 110 decrypts the encrypted challenge using the server's public key, which was transmitted to card 110 during the enrollment process as described above. The decrypted challenge and the original random challenge are compared. If the decrypted challenge and original random challenge match, then the card has confirmed administrator approval of the unblocking and the procedure flows to operation 428 wherein the status of the card is changed from BLOCKED back to ACTIVE. In operation 430, client 140 receives a message from card indicating success or failure of the unblock procedure and messages user and logs the result on a log server (not shown). The procedure then flows to operation 432 to reset the PIN and then to 434 for log in procedure. The PIN reset and log in authentication systems may be as described in related U.S. patent application Ser. Nos. 10/877,842 filed on Jun. 25, 2004 by Aseem Sharma et al., entitled "Server Authentication in Non-Secure Channel Card PIN Reset Methods and Computer Implemented Processes" and U.S. patent application Ser. No. 10/877,743 filed on Jun. 25, 2004 by Ellen Siegel et al., entitled "Authentication System And Method for Operating the Same." These applications are incorporated herein by reference.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium may include an electromagnetic wave carrier. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Embodiments of the present invention can be processed on a single computer, or using multiple computers or computer components which are interconnected. A computer, as used herein, shall include a standalone computer system having its own processor(s), its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. An authentication system comprising:
    a smart access card issued to a user, the smart access card having an authentication credential comprising an authentication certificate and a card unique identifier (CUID), the authentication certificate having a copy of the CUID;
    a desktop authentication module in a client computer, the desktop authentication module configured to prevent a user from accessing resources of the client computer;
    a card reader interface providing communication between the smart access card and the desktop authentication module; and
    an enrollment server for enrolling the smart access card into a server data store, the enrollment server receiving the authentication credential from the desktop authentication module obtained from the smart access card and performing a two factor authentication for the user, the two factor authentication including verifying that the CUID has been issued to the user and that the certificate stored on the smart access card has a valid signature.

2. The authentication system of claim 1, wherein the two factor authentication includes confirming a valid single sign-on (SSO) token is present on the client computer, wherein a valid SSO token evidences successful lightweight directory access protocol (LDAP) authentication.

3. The authentication system of claim 1, wherein the two factor authentication includes verifying that the CUID stored on the smart access card corresponds with a user identifier (UID) provided by the user.

4. The authentication system of claim 1, wherein the two factor authentication further includes verifying that a copy of the CUID stored in the certificate matches the CUID.

5. The authentication system of claim 1, wherein the smart access card contains a status variable that identifies a status of the smart access card, the status being changed from an initial status indicating the smart access card is in an issued state to an intermediate status indicating the smart access card is enrolled when the enrollment stores information pertaining to the smart access card in the server data store.

6. The authentication system of claim 5, wherein the smart access card executes a set personal identification number (PIN) procedure upon being enrolled, the status variable being updated from the intermediate status to a normal in-use status indicating that the smart access card is active after the set PIN procedure.

7. The authentication system of claim 1, wherein the smart access card, upon being enrolled, executes a set PIN procedure.

8. The authentication system of claim 1, wherein a server public key is transmitted to and stored in the smart access card after the enrolling.

9. The authentication system of claim 8, wherein the smart access card contains a status variable that identifies a status of the smart access card, the status being changed to reflect a PIN blocked state when a user has consecutively incorrectly entered a PIN number a selected number times.

10. The authentication system of claim 9, further comprising a PIN unblock server configured to verify that a network administrator has enabled PIN unblock for the smart access card in response to a request from the desktop authentication module, the PIN unblock server being further configured to create an encrypted challenge string using a random challenge string generated by the smart access card and a server private key, the PIN unblock server sending the encrypted challenge string to the smart access card, the smart access card being configured to decrypt the encrypted challenge string using the server public key stored in the smart access card and compare a result of the decrypting with the random challenge string, wherein, when the comparison results in a match, the smart access card unblocks the PIN and changes the status variable back to one reflecting a normal state.

11. The authentication system of claim 10, wherein the desktop authentication module facilitates communication between the smart access card and the PIN unblock server.

12. A method for enrolling a smart access card in a user authentication system, the method comprising:
    sending a user identifier (UID) and password from a client to an authentication server for lightweight directory access protocol (LDAP) authentication, the authentication server sending a single sign-on (SSO) token to the client;
    sending UID, password, SSO, a card unique identifier (CUID) associated with the smart access card, and a smart access card public key infrastructure (PKI) certificate in an enrollment request to an enrollment server, the enrollment server being configured to execute two factor authentication in response to the enrollment request, the two factor authentication including verifying that the CUID has been issued to the UID and that the PKI certificate has a valid signature;
    creating an entry in a server data store containing information pertaining to the smart access card when the two factor authentication is successful;
    sending a message to the client when the entry is created;
    requesting a new personal identification number (PIN) at the client in response to receiving the message.

13. The method of claim 12, further comprising sending a server public key to the client when the entry is created.

14. The method of claim 13, further comprising executing a PIN unblock procedure, the PIN unblock procedure comprising authenticating a PIN unblock server to the smart access card using the server public key.

15. The method of claim 14, wherein the authenticating the PIN unblock server comprises generating a random challenge within the smart access card, transmitting the random challenge to the PIN unblock server, generating an encrypted random challenge by encrypting the random challenge at the PIN unblock server using a server private key, sending the encrypted random challenge to the smart access card, and decrypting the encrypted random challenge using the server public key and comparing a result of the decrypting with the random challenge, wherein when the random challenge matches the result, the PIN unblock server is authenticated.

16. The method of claim 14, wherein the PIN unblock procedure further comprises checking the data store to verify that a network administrator has enabled PIN unblock for the particular smart access card.

17. The method of claim 12, wherein the sending a username and password from the client comprises executing a desktop authentication module that prevents the user from accessing computer resources prior to completing the two factor authentication.

18. A computer program embedded in a computer-readable storage medium, when executed by one or more processors, for authenticating users in a computing system, the computer program comprising:

a code segment for receiving from a client computer a password and username of a user, a public key infrastructure (PKI) certificate from a smart access card, a card unique identifier (CUID) from the smart access card, and a user identifier (UID);

a code segment for having an enrollment server access a data store to verify a first condition that the UID and the CUID correspond;

a code segment for having the enrollment server verify a second condition that a digital signature of the PKI certificate is valid;

a code segment for having the enrollment server verify a third condition that the PKI certificate corresponds to the CUID; and a code segment for having the enrollment server access the data store to verify a fourth condition that the state of the smart access card status is valid for enrollment.

19. The computer program of claim 18, further comprising:

a code segment for creating an entry for the smart access card in the data store when the first, second, third, and fourth conditions are met; and a code segment for transmitting one of a success or failure message to a client in response to the client computer.

20. The computer program of claim 19 further comprising:

a code segment for verifying that the client computer has successfully completed lightweight directory access protocol (LDAP) authentication prior to creating the entry for the smart access card in the data store.

21. A computer program embedded in a computer-readable storage medium, when executed by one or more processors, for unblocking a PIN, the computer program comprising:

a code segment for receiving a PIN unblock request from a client computer, the request including a random challenge generated by a smart access card and a card unique identifier (CUID) corresponding to the smart access card;

a code segment for authenticating the smart access card and a user requesting PIN unblocking, the authenticating the smart access card including verifying that a certificate stored on the smart access card has a valid signature and the CUID corresponds to a user identifier (UID) of the user;

a code segment for accessing a data store to verify that PIN unblock for the particular smart access card has been enabled by an administrator;

a code segment for retrieving a server private key when the PIN unblock was enabled;

a code segment for generating an encrypted challenge from the random challenge using the server private key when the PIN unblock was enabled;

a code segment for transmitting the encrypted challenge to the client computer; and a code segment to unblock the card when the random challenge matches the encrypted challenge.

22. The computer program of claim 21, wherein the code segment for authenticating comprises:

a code segment for verifying that the client computer contains a valid single sign-on token.

\* \* \* \* \*